Oct. 17, 1950  H. H. MEINCKE  2,526,081
FERTILIZER DISTRIBUTOR
Filed July 16, 1947  3 Sheets-Sheet 1

H. H. Meincke
INVENTOR
BY Knowles
ATTORNEYS.

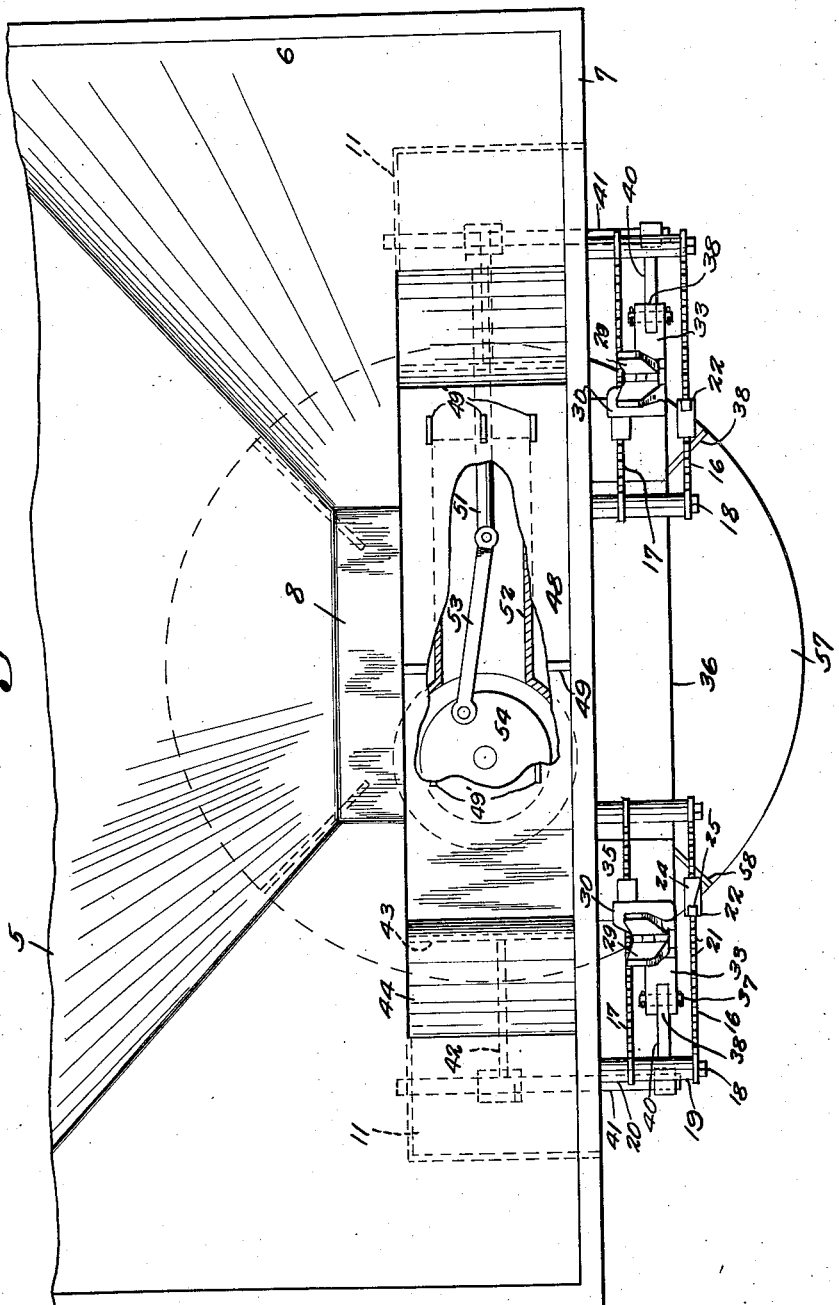

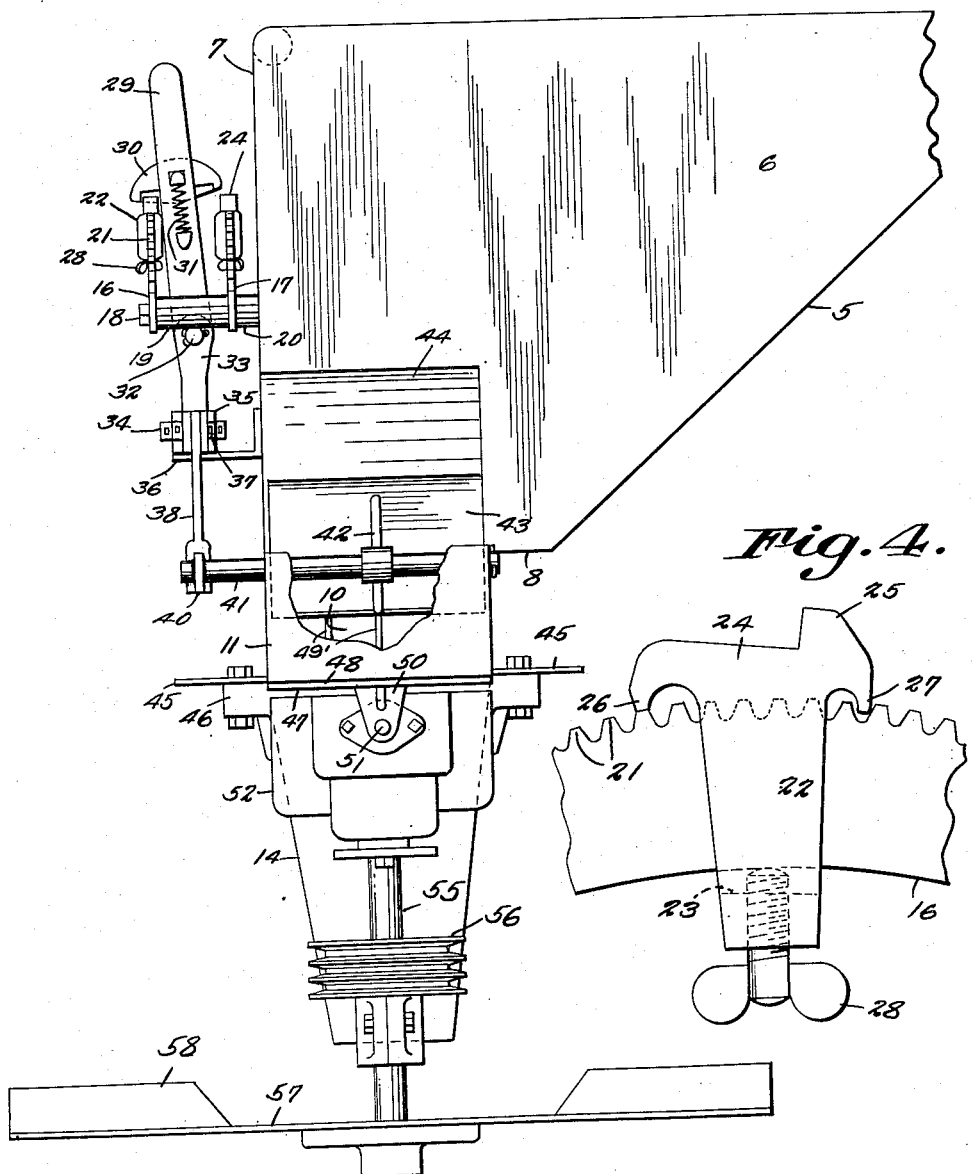

Patented Oct. 17, 1950

2,526,081

UNITED STATES PATENT OFFICE 2,526,081

FERTILIZER DISTRIBUTOR

Henry H. Meincke, Howey In The Hills, Fla.

Application July 16, 1947, Serial No. 761,237

6 Claims. (Cl. 275—8)

This invention relates to a fertilizer distributor or spreader, and more particularly, has reference to machines of this type primarily designed for distributing fertilizer in citrus groves.

In the art, considerable difficulty has been experienced in providing a means whereby fertilizer can be distributed speedily and efficiently in large groves of the type described, one of the main difficulties being that it is very important that the fertilizer be distributed in such a way that a proper amount thereof, and no more, be applied to trees of various types, such as orange or grapefruit trees. For example, grapefruit trees require a much greater poundage of fertilizer, than do orange trees, and when, as is quite common, both types of trees are planted in the same row, it becomes difficult to control the poundage of the fertilizer as it is being spread by the machine, and yet accomplish speedy distribution by the machine, as it continues its movement along a row.

Various machines have been devised for accomplishing the functions stated, but in general, difficulties are still experienced therewith, since it often happens that the poundage to be distributed as the machine proceeds becomes in fact critical, obviously necessitating the provision of a means for varying the poundage as the machine continues its regular movement along a row within critical limits, at the exact point and time necessary.

It is an important object of the invention to provide such a means, the invention embodying a poundage control means wherein fertilizer carried by the machine in bulk form can be distributed thereby in amounts varying from one to fifty pounds per tree, such poundage control means being capable of immediate and accurate operation without the necessity of stopping distribution of fertilizer by the machine, or halting or slowing its movement along a row of trees.

It is a further object of the invention to embody in a poundage control means a provision for adjustment thereof within critical limits, whereby an unusual number of adjustments can be effected, so that poundage control can be varied in amounts of as little as one eighth pound.

It is a further important object of the invention to provide an improved spreading means, whereby fertilizer is alternately forced from opposed sides of a hopper, by means of a novelly designed and operating reciprocating plate structure, which cooperates with the poundage control means stated so that fertilizer is not only distributed in adjustably determined poundage amounts, but also, is spread evenly, speedily, and without waste, to the trees of the rows along which the spreader is moving.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 2 is a top plan view, portions being broken away.

Figure 3 is a side elevational view, taken from the right of Figure 1, in which the right hand spout in Figure 1 has been removed, for the purpose of showing details of construction whereby a reciprocating plate is operated, other portions also being broken away.

Figure 4 is a front elevational view, on an enlarged scale, showing a movable lug embodied in the poundage control means, mounted upon a quadrant, the quadrant being shown only fragmentarily.

Figure 1:
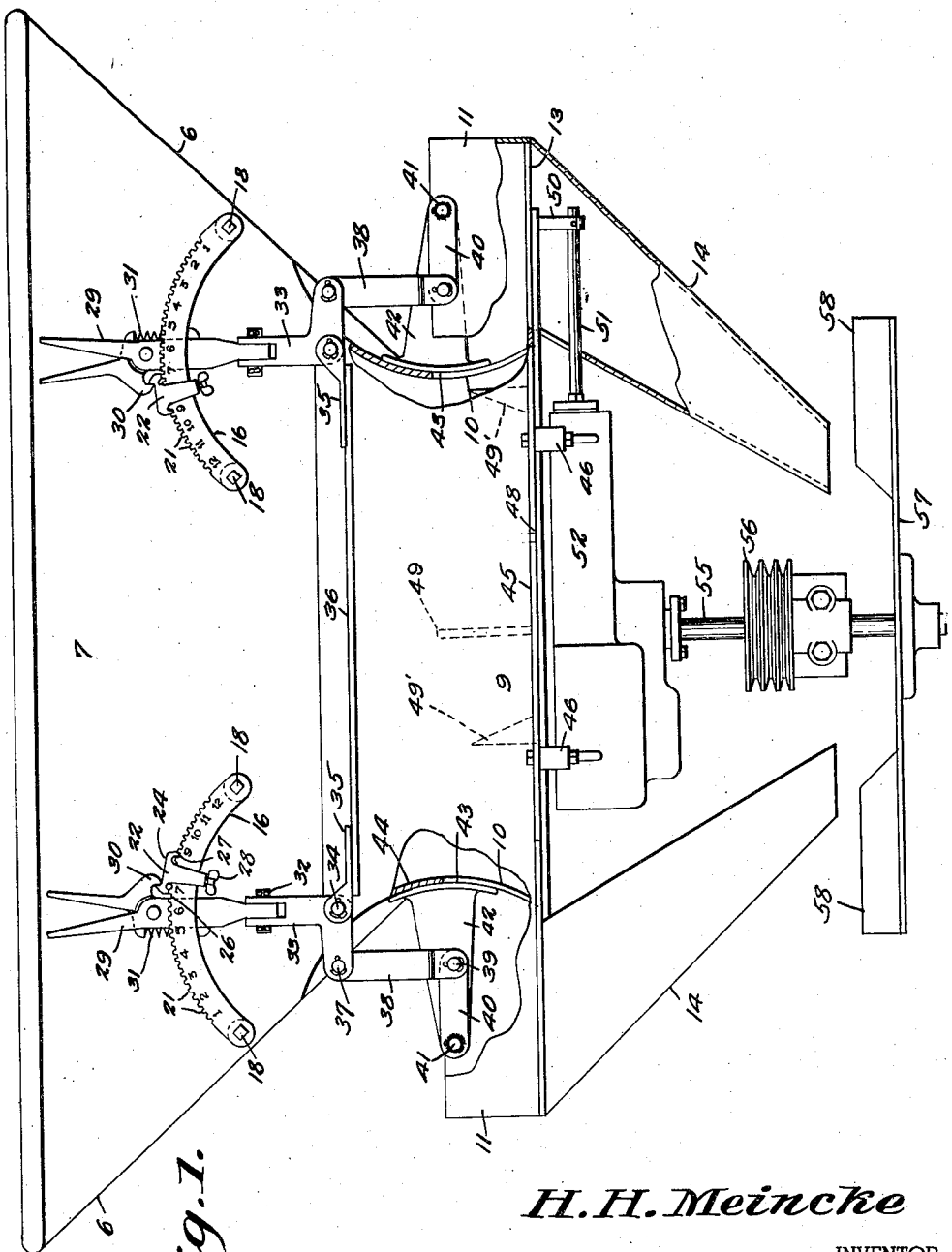
Figure 1 is an end elevational view of a fertilizer distributor constructed in accordance with the invention, portions thereof being broken away for the purpose of showing details of construction.

Referring to the drawing in detail, the machine which constitutes the subject of the invention is, in general, mounted upon a truck or the like, at any suitable location thereon, preferably the rear, so that the machine may be moved along a row of trees. The fertilizer to be distributed by the machine is initially deposited in a large hopper at the top of the machine, this comprising a back wall 5, side walls 6, and a front wall 7. Preferably, the front wall 7 is vertically disposed, while the other walls of the hopper may be obliquely arranged, various hopper constructions being well known in the art, and being capable of embodiment in the structure which is the subject of invention.

Normally, the bottom of the hopper would be defined by a bottom 8, but in the invention, a portion of the bottom, and of the side walls 6, is cut away, as clearly shown in Figure 2, for the provision of a lower extension 9 of the hopper. As will be described hereinafter in detail, the lower extension 9 is closed as to its bottom, so that fertilizer carried by the hopper moves out of the hopper through opposed poundage control outlet openings 10 at the sides of the lower extension, into opposed side boxes 11, this arrangement being particularly shown in Figure 1.

The side boxes 11 are provided with open bottoms 13, as a result of which fertilizer forced into the side boxes gravitates into opposed spouts 14, that are extended downwardly from the sides of the device in converging relation.

The above traces the path of the fertilizer from its initial depositing in bulk in the hopper, until it moves out of the lower or discharge ends of the spouts 14.

It is to be noted that the only outlet for the fertilizer from the hopper is through the opposed poundage control outlet openings 10, the invention embodying a novel means for controlling the size of said openings, whereby the poundage may be varied over an unusually wide range, and within unusually critical limits, while the machine is moving along a row. For the purpose of controlling the poundage moving through the respective openings 10, a separate control means is provided for each of said openings, these mechanisms being preferably mounted on the front wall 7 of the hopper, adjacent the sides thereof, and above each opening 10, as clearly shown in Figure 1. Each of said means embodies a pair of parallel spaced quadrants 16 and 17, each bearing numerical markings to designate poundage control settings (Fig. 1). Through the ends of the quadrants are passed bolts 18, whereby they are fixedly mounted against the front wall 7. Spacing sleeves 19 carried by the bolts 18 space the quadrants 16 and 17 from each other a suitable distance, and spacing sleeves 20 also carried by bolts 18 space the inner quadrant 17 from the front wall 7.

The upper edges of quadrants 16 and 17 are formed with a plurality of teeth 21, which as best shown in Figure 4, are formed with squared ends, for a purpose to become apparent hereinafter.

On each quadrant is slidably mounted, for movement along the arc thereof, one or more movable lugs 22. In the embodiment of the invention illustrated in the drawings, one lug 22 is shown on each quadrant. However, it is possible, within the spirit of the invention, to mount two or even more lugs on each quadrant, whereby to establish an increased number of predetermined poundage control settings.

Each lug 22 is vertically slotted, for reception of the quadrant, whereby to provide a preferred type of slidable mounting for the lug. The width of the slot is greater than the width of the quadrant, as shown at 23 in Figure 4, so that the lug 22 is not only slidable longitudinally of the quadrant, but also, is permitted limited movement transversely relative to the quadrant.

A head 24 of the lug 22 overlies the teeth 21 of the quadrant, and at one end the head is provided with an abutment 25 the head 24 being also formed, at both ends thereof, with inwardly extended projections 26 and 27, respectively, having squared ends corresponding to the squared ends of the teeth 21. This construction is best shown in Figure 4. A thumb screw 28 is threadable through the other end of lug 22, projecting into the slot of the lug, in order that it may engage the adjacent edge of the quadrant.

As a result of the construction described, a desired number of teeth 21 may be formed in the quadrant between adjacent poundage markings. As an example, and preferably, four such teeth can be provided between adjacent markings, although of course, the number of teeth can be varied to the extent of being either increased or lessened as desired.

The purpose of the lug 22, in this connection, is to determine before the machine is used for distributing fertilizer, a poundage control setting for each quadrant. Thumb screw 28 is accordingly loosened, and lug 22 is slidably moved to the desired point on the arc of the quadrant. Thumb screw 28 is then tightened against the quadrant, locking the lug thereto. When the lug is locked, one of the projections 26 and 27 thereof will be in engagement with the end of a tooth 21, while the other projection will be seated in a notch defined between two other teeth. In Figure 4, the squared end of projection 26 is seated on the squared end of a tooth, while projection 27 is seated in a notch. Should a variation of a critical fraction of a pound be desired, it is necessary only to loosen thumb screw 28, and move lug 22 a very small amount, so that projection 26 is now moved into a notch adjacent thereto, while projection 27 is seated in engagement with the squared end of a tooth 21. Thus, it is readily observed that a predetermined poundage control setting can be established simply and speedily within unusually critical limits, whenever the poundage should be controlled to this extent, a quite common occurrence in the art of spreading fertilizer in groves of the type described.

As mentioned above, more than one lug 22 may if desired be positioned on each quadrant. Thus, the number of predetermined poundage control settings desired may be increased prior to operation of the machine, according to the particular grove through which the machine is to be moved. However, if one lug only is used on each quadrant, there is still provided a double poundage control for each opening 10, as will be apparent from the fact that a pair of quadrants is used in connection with each of said openings.

A latch lever 29 is extended upwardly between the quadrants 16 and 17, and this carries a latch 30 which, as best shown in Figure 3, is widened transversely, so as to extend beyond either side of the latch 29. Thus, latch 30 can alternately be engaged under the control of an operator, with an abutment 25 on lug 22 of quadrant 16, or with the abutment of the lug carried by quadrant 17. Spring 31 is connected at one end to latch lever 29, and at the other end to the pivotally mounted latch 30, and this spring is held under compression, so that its normal tendency to expand yieldably retains latch 30 in engagement with the abutment 25.

At its lower end, the latch lever 29 is pivotally connected by means of a pin 32 to one end of a bell crank lever 33, the lever 29 being so connected, as shown in Figures 1 and 3, as to be swingable in an arc toward or away from the respective quadrants 16 and 17 between which it is positioned. This construction permits the operator, by grasping the handles on latch lever 29 and latch 30, to bring the latch 30 out of engagement with the lug on one quadrant, swing it over to the other quadrant, and place it in engagement with the lug on the latter quadrant.

Intermediate its ends, bell crank lever 33 is pivotally connected by pin 34 to the arms of a bearing bracket 35, fixedly mounted on the end of a supporting plate 36. Thus, latch lever 29 is swingable not only transversely relative to quadrants 16 and 17, but also, longitudinally of the quadrants.

At their other ends, the bell crank levers 33 at the respective sides of the hopper are respectively connected by pins 37 to links 38. Each link 38 is pivotally connected by pin 39, at its other end, to one end of rod 40, that is keyed or otherwise fixedly connected to an end of a rotatable bar 41.

The respective bars 41 are journaled for rotation in the side walls of the side boxes 11. Each bar 41, intermediate its ends, is fixedly joined by any suitable means to one end of an arm 42, the other end of which carries an arcuate shutter 43.

By reason of the construction described above, it is seen that when the latch lever 29 is gripped and moved longitudinally of the quadrants 16 and 17, the lever connections shown will cause rod 40 to rotate bar 41, and bar 41 in turn will actuate the shutter 43.

Shutter 43 rides on a curved portion 44 of each side wall 6 of the hopper, said curved portion being positioned immediately above each poundage control outlet opening 10.

According to the longitudinal movement of latch lever 29 effected by the operator, each shutter 43 closes its respective opening 10 to any desired degree, whereby to control the size of the opening. Since both quadrants 16 and 17 are used in connection with each opening 10, with lugs 22 set at different positions on each quadrant in advance of operation of the fertilizer spreader, double poundage control means is provided, and during movement of the spreader along a row, the operator can almost instantaneously change the size of each opening 10, to cause a different poundage to move through each opening. Or, the operator can close one opening entirely, if desired. If more than one lug 22 is used on each quadrant, the number of predetermined settings and changes of poundage which can be so effected would of course be increased. This is unusually desirable, for instance where orange and grapefruit trees are arranged in the same row, grapefruit trees requiring a considerably greater amount of poundage of fertilizer. The required change can, as will be obvious, be effected without slowing up or stopping the spreader. Should it be necessary that the poundage be varied within critical limits, the lugs 22 will have been adjustably set accordingly, in advance.

Referring now to the means whereby spreading of the fertilizer is accomplished, and directing attention particularly to Figure 3, longitudinal flanges 45 are extended along the bottom of the lower extension 9 of the hopper. These may conveniently be formed by bending the front and rear walls of the lower extension outwardly. To the under side of these flanges are fixedly connected, by any suitable means, supporting members 46 extended transversely across the bottom of the lower extension, in parallel relation. The portions of said members that are disposed across the bottom of the lower extension are shallowly recessed, as shown at 47, and slidably mounted in the recesses for movement longitudinally of the lower extension 9 is a reciprocating plate 48. The plate 48 constitutes the bottom of the lower extension 9. Fixedly mounted in the lower extension 9, and extended transversely across the plate 48, is an upstanding partition 49, under which the plate 48 slides.

The reciprocating plate, while always closing the bottom of the lower extension in every position to which the plate is moved, is reciprocated in opposite directions for the purpose of alternately closing, to a partial extent, the open bottoms 13 of the opposed side boxes 11. As a means for so reciprocating the plate 48, I provide an ear 50 depending from one end thereof, to which is fixedly connected one end of a connecting rod 51. Connecting rod 51 is extended into a reduction gear housing 52, and is pivotally connected at its other end to a pitman 53 contained in the housing (Figure 2). Pitman 53 is actuated by wheel 54, rotatable at a desired speed, by means of suitable reduction gearing, by a drive shaft 55. Drive shaft 55 carries a set of pulleys 56, whereby it may receive power from a suitable power source (not shown).

Also rotatable by drive shaft 55 is a large spreader disc 57, having spaced radial fins 58 upstandingly mounted on its upper surface. The converging discharge ends of the opposed spouts 14 are positioned over opposite sides of the spreader disc 57, and as fertilizer moves out of the spouts 14, it gravitates to the spreader disc 57, and is distributed to the trees of the rows between which the machine is moving by means of the fins 58.

It has been found that the size of the respective outlet openings 10 having been controlled previously, to permit only designated poundages of fertilizer to move through each opening, the plate 48, when moved in one direction, will carry a core of fertilizer through the opening 10, said core being of predetermined quantity, as described. As it does so, fertilizer will drop down and replace the amount carried through the opening. Thus, when the plate is reciprocated in the opposite direction, the core of material carried through the opening can only drop down through spout 14, since the fixed partition 49, in cooperation with the fertilizer replacing the core, will prevent its return.

It is considered desirable that means be carried by the plate for breaking up lumps during the operation. Accordingly, on either side of partition 49, a plurality of upstanding cutter blades 49' are provided, that are fixedly mounted on plate 48 in any suitable manner.

It is important to note that in a device constructed in accordance with the invention, as the machine is moved along a row, the operator thereof may almost instantaneously vary the poundage control of each opening 10, by shifting the latch lever 29 from the particular quadrant against which it is positioned, over to the other quadrant. He may thus effect instantly any necessary changes, according to the number of lugs 22 used on each quadrant, and may vary the poundage within unusually critical limits, all these changes being effected by swinging of the latch lever 29 transversely between the quadrants, or longitudinally thereof, as required. Additionally, either or both openings 10 may be closed entirely without changing any poundage control setting, and may again be opened to the exact extent desired.

Obviously, the range of settings as to the total number of pounds to be spread, or as to the critical fractions of pounds desired, is great, and within the spirit of the invention, any settings, including fractional settings, can be had over a range of, for example, one to fifty pounds.

What is claimed is:

1. A fertilizer distributor, comprising a hopper having side outlet openings, open bottomed side boxes respectively communicating with the outlet openings, a slidable reciprocating plate, constituting a closure member for the boxes, mounted at the bottom of the hopper, an upstanding partition mounted in the hopper above the plate, spouts mounted under the boxes, a rotatable spreading disc positioned under the spouts, a drive shaft rotatably mounted on and under the hopper, said disc being secured to said shaft for rotation therewith, and a linkage between said shaft and the plate adapted for reciprocating the plate in opposite directions upon rotation of the shaft, cutter blades on the plate, shutters swingable over the outlet openings, and means for adjustably positioning said shutters relative to the outlet openings, whereby to control the size of said openings.

2. A fertilizer distributor, comprising a hopper, the hopper having side outlet openings, means for adjustably regulating the size of said openings, open bottomed side boxes mounted on the hopper in communication with the openings, a reciprocating plate slidably mounted on the hopper, constituting a closure member for the side boxes, said plate when reciprocated carrying through the respective openings cores of fertilizer formed to the adjusted size of said openings, spouts mounted under the side boxes, a rotatable spreading disc positioned under the spouts, and means operatively connected to the disc and plate, for rotating the disc and reciprocating the plate in opposite directions.

3. A fertilizer distributor, comprising a hopper, the hopper having side outlet openings, side boxes on the hopper communicating with the outlet openings, parallel quadrants mounted on the hopper over each opening, lugs lockable in adjustable positions to the quadrants, latch levers movable longitudinally and transversely of the quadrants and engageable with the lugs thereof, shutters operatively connected to the latch levers, whereby to control the size of the outlet openings when the lever is moved into engagement with selected lugs, a reciprocating plate slidably mounted at the bottom of the hopper and constituting a bottom therefor, said plate when reciprocated carrying through the respective openings cores of fertilizer formed to the adjusted size of said openings, said plate serving as a closure member movable into position across the open bottoms of the side boxes, spouts mounted under the side boxes, a spreading disc positioned under the spouts, and means for rotating the disc and reciprocating the plate, said means comprising a drive shaft, the spreader disc being secured to said shaft for rotation therewith, and a pitman connection between said shaft and the plate and secured to the underside of the plate for reciprocating the plate on rotation of the shaft.

4. A fertilizer distributor, comprising a hopper, the hopper having opposed outlet openings, side boxes on the hopper communicating with the respective outlet openings, said side boxes having open bottoms, a pair of quadrants mounted in parallel relation on the hopper over each outlet opening, lugs lockable in selected positions to the quadrants, latch levers engageable with the lugs and movable transversely and longitudinally between the quadrants, lever means mounted on the hopper and connected to the latch levers, a shutter swingably mounted on the hopper and positioned over each outlet opening, said shutter being operatively connected to and swingable by the lever means on actuation thereof by the latch lever, a reciprocating plate on the hopper movable into position over the bottoms of the side boxes, and means for reciprocating the plate in opposite directions.

5. A fertilizer distributor, comprising a hopper having outlet openings, connected levers mounted adjacent each opening, a closure positioned over each opening and connected to the levers for actuation thereby, means under the control of an operator for locking the levers in selected positions of adjustment, whereby to position the closures in adjusted positions relative to the openings, thereby to control the size of the openings, open bottomed side boxes on the hopper mounted in communication with said openings, a plate slidably mounted at the bottom of the hopper and alternately movable across the bottoms of the respective side boxes, means carried thereby for cutting fertilizer gravitating to the bottom of the hopper, an upstanding partition fixedly mounted in the hopper proportioned to prevent fertilizer material deposited in the hopper adjacent one opening from shifting toward the other opening on movement of the plate toward said other opening, spouts depending from the side boxes, a drive shaft, a linkage connecting said shaft to the plate for reciprocation of the plate by rotation of the shaft, a spreader disc secured to the drive shaft for rotation therewith and positioned below the spouts, and means for rotating the drive shaft, whereby to actuate the plate and spreader disc.

6. A fertilizer distributor, comprising a hopper, a plate, constituting a bottom, slidably mounted thereon, open bottomed side boxes on the hopper, the plate being movable in opposite directions whereby to close the bottoms of the side boxes alternately, an upstanding partition centrally mounted in the hopper above the plate, there being outlet openings at the sides of the hopper communicating with the side boxes, a pair of parallel quadrants mounted adjacent each outlet opening, lugs lockable in adjusted positions to the quadrants, a latch lever between each pair of quadrants engageable with the lugs, a series of levers, mounted on the hopper, connected to each latch lever for actuation thereby, each latch lever being connected to its series of levers for movement longitudinally and transversely of its pair of quadrants, spouts downwardly extended from the respective side boxes, a drive shaft, a spreader disc rotatably carried thereby, the spreader disc being positioned under the lower ends of the spouts, reduction gearing operatively connected to the drive shaft for actuation thereby, a pitman connection between the reduction gearing and slidable plate, adapted to reciprocate the plate in opposite directions on rotation of the drive shaft, and means for rotating the drive shaft.

HENRY H. MEINCKE.

REFERENCES CITED

The following references are of record in the file of this patent:

UNITED STATES PATENTS

| Number | Name | Date |
|---|---|---|
| 15,104 | Luce | June 10, 1856 |
| 685,119 | Elliott | Oct. 22, 1901 |
| 1,296,255 | Aspinwall | Mar. 4, 1919 |
| 1,650,808 | Van Brunt | Nov. 29, 1927 |
| 2,134,612 | Jennings | Oct. 25, 1938 |
| 2,334,376 | Bauer | Nov. 16, 1943 |
| 2,416,804 | Ulrich | Mar. 4, 1947 |
| 2,418,271 | Meincke | Apr. 1, 1947 |

FOREIGN PATENTS

| Number | Country | Date |
|---|---|---|
| 215,011 | Germany | Oct. 22, 1909 |